(12) United States Patent
Lin et al.

(10) Patent No.: US 9,282,057 B2
(45) Date of Patent: Mar. 8, 2016

(54) FLEXIBLE STACKING PORT

(75) Inventors: Kevin Kwun-Nan Lin, Saratoga, CA (US); Bipin Agarwal, San Jose, CA (US); Marc Lavine, Sunnyvale, CA (US); Rajeshekhar Murtinty, San Jose, CA (US)

(73) Assignee: Brocade Communication Systems, Inc., San Jose, CA (US)

(*) Notice: Subject to any disclaimer, the term of this patent is extended or adjusted under 35 U.S.C. 154(b) by 1469 days.

(21) Appl. No.: 12/463,964

(22) Filed: May 11, 2009

(65) Prior Publication Data

US 2010/0284414 A1 Nov. 11, 2010

(51) Int. Cl.
*H04L 12/933* (2013.01)
*H04L 12/931* (2013.01)
*H04L 29/06* (2006.01)

(52) U.S. Cl.
CPC .............. *H04L 49/15* (2013.01); *H04L 49/351* (2013.01); *H04L 49/45* (2013.01); *H04L 49/65* (2013.01); *H04L 63/08* (2013.01)

(58) Field of Classification Search
USPC ......... 370/217, 218, 244, 256, 351, 386, 387, 370/388, 389, 392, 401, 402; 709/223, 224, 709/239, 242

See application file for complete search history.

(56) References Cited

U.S. PATENT DOCUMENTS

| 7,274,694 | B1 | 9/2007 | Cheng et al. |
| 7,480,258 | B1* | 1/2009 | Shuen et al. ................ 370/256 |
| 7,523,227 | B1* | 4/2009 | Yager et al. ..................... 710/16 |
| 2006/0072571 | A1* | 4/2006 | Navada et al. ................ 370/390 |
| 2006/0092853 | A1 | 5/2006 | Santoso et al. |
| 2006/0187900 | A1 | 8/2006 | Akbar |
| 2006/0253557 | A1 | 11/2006 | Talayco et al. |
| 2010/0172365 | A1 | 7/2010 | Baird et al. |

* cited by examiner

*Primary Examiner* — Hassan Phillips
*Assistant Examiner* — Saba Tsegaye
(74) *Attorney, Agent, or Firm* — Conley Rose, P.C.

(57) ABSTRACT

A stackable device having a plurality of data ports, wherein each of the data ports is capable of operating as a regular data port or a stacking port. A first set of one or more of the data ports is specified as a first flexible stacking port, and a second set of one or more of the data ports is specified as a second flexible stacking port. Each flexible stacking port can be individually configured to operate as an actual stacking port, if required by the configuration of an associated stack. If a flexible stacking port is not configured to operate as an actual stacking port, then the data port(s) included in the flexible stacking port are available to operate as regular data port(s).

24 Claims, 4 Drawing Sheets

FLEXIBLE STACKING PORT

FIELD OF THE INVENTION

The present invention relates to a stackable network switch having flexible ports that can be configured as either stacking ports or regular data ports.

RELATED ART

Local area networks (LANs) may be implemented using a chassis-based system, which includes a fixed chassis that supports a common backplane (i.e., a hardwired circuit board). The fixed chassis includes a plurality of slots for receiving and supporting a plurality of network switches (blades). When inserted into the slots in the chassis, connectors on the network switches engage with corresponding connectors in the backplane, whereby electrical connections are formed between the network switches and the backplane. The backplane provides electrical connections between the connected network switches, and allow the plurality of network switches to be operated as a single management unit. A slot number is assigned to each connector in the backplane in order to identify the placement of each network switch within the backplane. The slot numbers are fixed, and cannot be modified or assigned by the user of the chassis-based system. The hardwired nature of the backplane and the fixed slot numbers cause the configuration of the chassis-based system to be inflexible. Another disadvantage of the chassis-based system is the relatively large initial cost associated with purchasing the chassis/backplane.

An alternate system of connecting a plurality of network switches into a single management unit is a stackable switch system. A stackable switch system does not use a fixed chassis or a backplane. Rather, a stackable switch system includes a plurality of stackable network switches that are connected by cables that extend between dedicated stacking ports of the network switches. These cables effectively replace the backplane of the chassis-based system. In a stackable switch system, the network switches may be connected in various topologies by re-arranging the cables.

A conventional stackable network switch typically includes two dedicated stacking ports, which are used to connect the stackable network switch in a stack. In certain stack topologies, both of the dedicated stacking ports are not required. For example, in a linear stack topology, the two stackable network switches located at the ends of the linear stack will only use one of their two dedicated stacking ports. As a result, the linear stack will include two unused dedicated stacking ports. These two unused dedicated stacking ports are effectively 'wasted', because these stacking ports are dedicated to performing a stacking function, and cannot be used for any other purpose. That is, these dedicated stacking ports cannot be used for carrying regular data traffic. As a result, the user undesirably pays for hardware that cannot be used. To make matters worse, the dedicated stacking ports must be high-bandwidth ports (e.g., 10G ports) in order to connect the stackable network switches in a stack. Consequently, the dedicated stacking ports are relatively expensive.

It would therefore be desirable to have a stackable network switch that eliminates the wasted dedicated stacking ports described above.

SUMMARY

Accordingly, the present invention includes a stackable device (e.g., network switch) that includes a plurality of ports, each of which can be configured to implement a flexible stacking port or a regular data port. In one embodiment, the stackable device is configured to implement two flexible stacking ports. The ports that are not required to implement the two flexible stacking ports may be used to implement regular data ports. Each of the flexible stacking ports can be used as either a stacking port or a regular data port. Thus, if a flexible stacking port is not configured to operate as a stacking port, it may be used as a regular data port. If a flexible stacking port is a high-bandwidth port, the ability to use this flexible stacking port as regular data port may represent a significant benefit/savings for the user.

In accordance with one embodiment, a predetermined pair of high-bandwidth ports of the stackable device are designated as flexible stacking ports by default. However, a user may designate any high-bandwidth port of the stackable device to implement a flexible stacking port. In accordance with another embodiment, the user may designate a plurality of low-bandwidth ports of the stackable device to implement a flexible stacking port, wherein the plurality of low bandwidth ports are configured to form a high bandwidth trunk. Because multiple ports are included in such a flexible stacking port, a stack formed from such a flexible stacking port will remain functional (with reduced bandwidth) if some of the low bandwidth ports of the flexible stacking port exhibit problems (as long as some of the low bandwidth ports remain functional).

In accordance with one embodiment, the decision of whether a flexible stacking port is configured as a stacking port is made dynamically by the stackable device that operates as the active controller (master) of the stack.

The present invention will be more fully understood in view of the following description and drawings.

DETAILED DESCRIPTION

Figure 1:
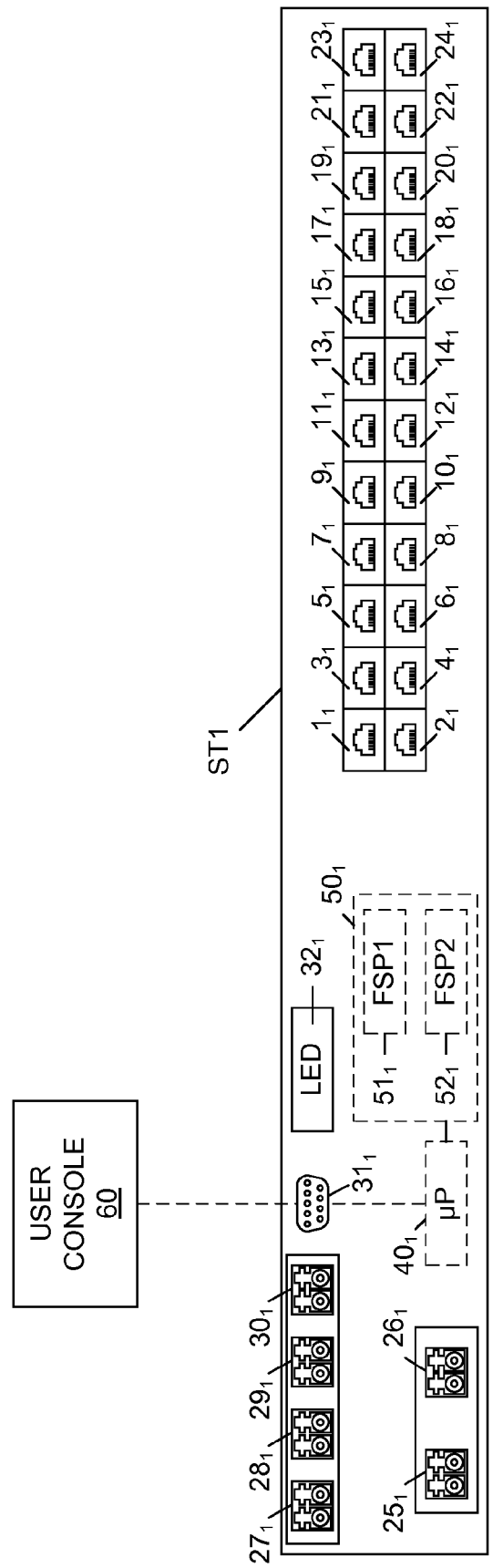
FIG. 1 is a block diagram of a stackable device in accordance with one embodiment of the present invention.

FIG. 1 is a block diagram of a stackable device (network switch) ST1 in accordance with one embodiment of the present invention. Stackable device ST1 includes 10/100/1000 Mb ports $1_1$-$24_1$, 10 Gb ports $25_1$-$30_1$, direct serial interface $31_1$, LED display $32_1$, processor $40_1$ and memory $50_1$ (which includes registers $51_1$ and $52_1$). Each of ports $1_1$-$24_1$ includes a copper-based module capable of transferring data at up to 1 Gigabit per second (Gbps) (full-duplex), and each of ports $25_1$-$30_1$ includes a fiber-based module capable of transferring data at speeds up to 10 Gbps (full-duplex). Because of their relative data transfer speeds, ports $1_1$-$24_1$ may be referred to as low-bandwidth ports, and ports $25_1$-$30_1$ may be referred to as high-bandwidth ports. Although stackable device ST1 includes 24 low-bandwidth ports and six high bandwidth ports, it is understood that stackable device ST1 may have other numbers of ports in other embodiments. In one embodiment, low-bandwidth ports $1_1$-$24_1$, high-bandwidth ports $27_1$-$30_1$, direct serial interface $31_1$ and LED display $32_1$ are located on a front panel of stackable device ST1, and high-bandwidth ports $25_1$-$26_1$ may be located on either the front panel or a back panel of stackable device ST1.

Two of the high-bandwidth ports of stackable device ST1 are initially designated as 'flexible stacking ports' by default. In the described examples, high-bandwidth ports $25_1$ and $26_1$ of stackable device ST1 are initially designated as the default flexible stacking ports. The flexible stacking ports are designated by the contents of flexible stacking port ID registers $51_1$ and $52_1$, which are configuration registers located within the memory $50_1$ of stackable device ST1. Thus, flexible stacking port ID register $51_1$ initially stores a value that specifies high-bandwidth port $25_1$ as one flexible stacking port of stackable device ST1, and flexible stacking port ID register $52_1$ initially stores a value that specifies high-bandwidth port $26_1$ as another flexible stacking port of stackable device ST1. As described in more detail below, the contents of flexible stacking port ID registers $51_1$ and $52_1$ can be modified via the processor $40_1$ of stackable device ST1, thereby changing the designated flexible stacking ports.

As defined herein, a flexible stacking port is a port that can be configured to operate as either an actual stacking port or a regular data port. If a flexible stacking port is not configured to operate as an actual stacking port, then this flexible stacking port will operate as a regular data port by default, such that the flexible stacking port is not 'wasted' if the flexible stacking port is not used as an actual stacking port. The manner in which a flexible stacking port is configured to operate as an actual stacking port is described in more detail below. Note that if neither of the designated flexible stacking ports is configured as an actual stacking port, then all of the ports $1_1$-$30_1$ of stackable device ST1 may operate as regular data ports.

In the described examples, low bandwidth ports $1_1$-$24_1$ and high-bandwidth ports $27_1$-$30_1$ are initially designated as regular data ports, by default. As defined herein, regular data ports provide connections for conventional network devices, which can include, for example, computing resources such as workstations, servers, printers and storage devices.

In accordance with one embodiment of the present invention, the default flexible stacking port designation of stackable device ST1 can be modified, such that one or more ports other than high-bandwidth ports $25_1$ and $26_1$ are designated as the flexible stacking ports. To change the identity of the flexible stacking ports, the contents of flexible stacking port ID registers $51_1$ and $52_1$ are written with new values that specify the new flexible stacking ports. Flexible stacking port ID registers $51_1$ and $52_1$ are written through processor $40_1$. More specifically, a user console 60 connected to direct serial port $31_1$ allows a user to overwrite the contents of flexible stacking port ID registers $51_1$ and $52_1$ through a command line interface (CLI) of processor $40_1$.

The various flexible stacking port designations will now be described. Any two of the high-bandwidth ports $27_1$-$30_1$ may be designated as the flexible stacking ports, by overwriting the contents of the flexible stacking port ID registers $51_1$ and $52_1$ with values that specify the two new desired flexible stacking ports. In this case, the high-bandwidth ports $25_1$ and $26_1$ become regular data ports.

Alternately, either one of the high-bandwidth ports $25_1$ or $26_1$ may remain a designated flexible stacking port, while any one of the high-bandwidth ports $27_1$-$30_1$ may be designated as the other flexible stacking port. In this case, the high-bandwidth port $25_1$ or $26_1$ that does not remain a flexible stacking port becomes a regular data port.

Alternately, a first set of the low-bandwidth ports $1_1$-$24_1$ may be designated as a flexible stacking port. For example, low-bandwidth ports $1_1$-$8_1$ may be designated as one of the flexible stacking ports. In this example, any one of the high-bandwidth ports $25_1$-$30_1$ may be designated as the other flexible stacking port of stackable device ST1. In this case, the low-bandwidth ports $9_1$-$24_1$ that are not included in the flexible stacking port, and the high-bandwidth ports that are not designated as a flexible stacking port, are regular data ports.

Alternately, a first set of the low-bandwidth ports $1_1$-$24_1$ may be designated as one flexible stacking port, and a second set of the low-bandwidth ports $1_1$-$24_1$ may be designated as the other flexible stacking port of stackable device ST1. For example, low-bandwidth ports $1_1$-$8_1$ may be designated as a first flexible stacking port of stackable device ST1, and low-bandwidth ports $9_1$-$16_1$ may be designated as the second flexible stacking port of stackable device ST1. In this case, the low-bandwidth ports $17_1$-$24_1$ that are not designated as flexible stacking ports, and the high-bandwidth ports $25_1$-$30_1$, are regular data ports.

When a plurality of low-bandwidth ports are designated as a flexible stacking port, the flexible stacking port has a trunk configuration. This trunk configuration advantageously increases the reliability of the flexible stacking port by adding a degree of fault tolerance, as the flexible stacking port may remain functional (at a reduced bandwidth) if one or more of the low-bandwidth ports becomes non-functional. Moreover, the effective bandwidth of the flexible stacking port can be selected by selecting the number of low-bandwidth ports included in the designated flexible stacking port. The user therefore has a great amount of flexibility in designing the flexible stacking ports.

Additionally, multiple ports can be used to form a stacking trunk to provide a great degree of fault tolerance.

In accordance with one embodiment of the present invention, a designated flexible stacking port may be configured to operate as either an actual stacking port or a regular data port. Thus, even if a port is designated as a flexible stacking port, it is not necessary that this port actually operates as a stacking port. If a flexible stacking port is not configured to operate as an actual stacking port, then the flexible stacking port will be able to operate as a regular data port by default, thereby further increasing the flexibility of stackable device ST1.

The manner in which the designated flexible stacking ports are configured as either actual stacking ports or regular data ports will now be described in more detail.

Initially, a stack including a plurality of stackable devices is established. Flexible stacking ports of the stackable devices are connected by stacking links (cables), and an active controller (i.e., one of the stackable devices) of the stack is selected. The active controller identifies the stackable devices included in the stack. The active controller also identifies the topology of the stack (e.g., linear or ring, number of upstream/downstream devices). In response to the identified topology, the active controller configures the flexible stacking ports that are required to implement this topology as actual stacking ports. Flexible stacking ports that are not configured as actual stacking ports maintain their default configuration as regular data ports. Information identifying the configuration of the stack is stored in the memory of each stackable device included in the stack.

Figures 2, 3:
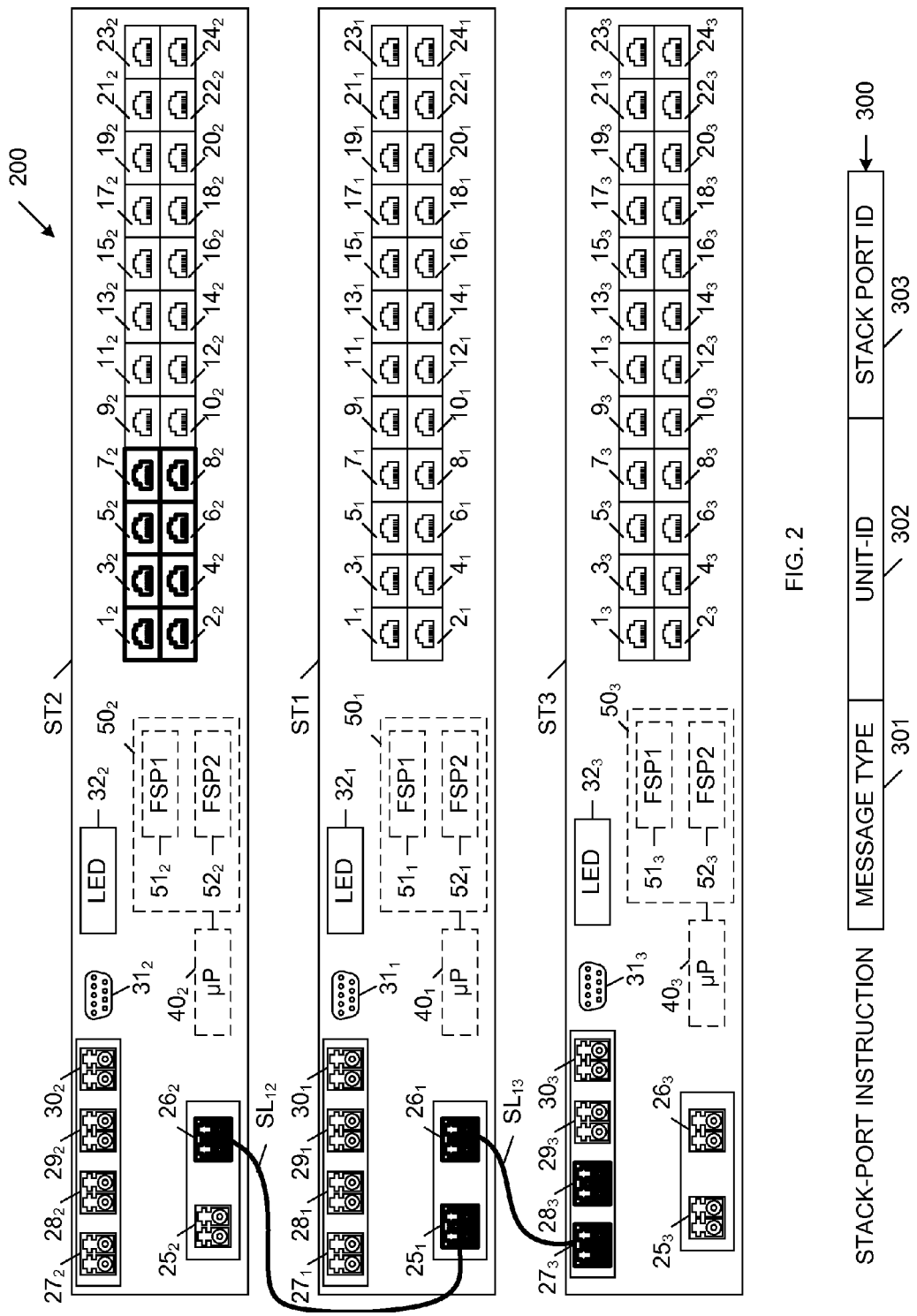
FIG. 2 is a block diagram of a stack that includes three stackable devices, which are configured in a linear topology in accordance with one embodiment of the present invention.
FIG. 3 is a block diagram illustrating the relevant fields of a 'stack-port' instruction in accordance with one embodiment of the present invention.

FIG. 2 is a block diagram of a stack 200 that includes three stackable devices ST1, ST2 and ST3, which are configured in a linear topology in accordance with one embodiment of the present invention. As described herein, a 'stack' is a group of stackable devices that are connected to operate as a single management unit. In general, stack 200 controls the routing of data (packets/frames) between network devices (not shown) coupled to regular data ports of the different stackable devices ST1-ST3. Although stack 200 includes three stackable devices ST1-ST3, in the embodiments described herein, a stack may include other numbers of stackable devices in other embodiments.

In the described examples, stackable devices ST1-ST3 are identical, although this is not necessary. In other embodiments, stackable devices ST1-ST3 may represent different models of a common switch family. Similar elements in stackable devices ST1-ST3 are labeled with similar reference numbers, wherein elements on stackable devices ST1, ST2 and ST3 are labeled with subscripts 1, 2 and 3, respectively.

The flexible stacking ports of each of the stackable devices ST1-ST3 are initially designated in the manner described above. In the embodiment of FIG. 2, the default flexible stacking port designations of stackable device ST1 are used, such that high-bandwidth ports $25_1$ and $26_1$ are designated as the flexible stacking ports of stackable device ST1. High-bandwidth port $26_2$ and low-bandwidth ports $1_2$-$8_2$ are designated as the flexible stacking ports of stackable device ST2. High-bandwidth ports $27_3$ and $28_3$ are designated as the flexible stacking ports of stackable device ST3. The designated flexible stacking ports are shown in bold in FIG. 2.

Stacking links (cables) are used to connect the designated flexible stacking ports in the desired topology. In the embodiment of FIG. 2, stacking link $SL_{12}$ connects flexible stacking ports $25_1$ and $26_2$, and stacking link $SL_{13}$ connects flexible stacking ports $26_1$ and $27_3$.

The user initially selects a topology for the desired stack using techniques known to those of ordinary skill in the art. For example, stack 200 may be formed by an automatic stack configuration method, wherein all configuration information, including the module types and the priorities of the stackable devices to be included in the stack, are entered into the memory of a single stackable device ST1 that becomes the active controller (master) of the stack 200. The other stackable devices ST2-ST3 are initially 'clean' units that do not contain startup or run time configurations. The flexible stacking ports of these stackable devices are connected in the desired topology. Stacking is then enabled on the active controller ST1, and the stack 200 forms automatically.

In another example, the stack 200 can be configured manually. In this method, each of the stackable devices ST1-ST3 to be included in the stack 200 is configured individually, and stacking is enabled on each of these stackable devices ST1-ST3. Once the flexible stacking ports of these stackable devices ST1-ST3 are connected in the desired topology, these stackable devices will automatically operate as a stack. With this method, the stackable device having the highest assigned priority becomes the active controller.

In another example, the stack can be formed by the stack secure setup method described in commonly owned, co-pending U.S. patent application Ser. No. 08/417,961, by Agarwal entitled "Secure Stacking Setup" which is hereby incorporated by reference in its entirety. In this method, the stack 200 is configured via a user console coupled to one of the stackable devices. In this method, the stackable device coupled to the user console is designated as the active controller of the stack.

In the described examples, stackable device ST1 is designated as the active controller of stack 200.

In accordance with one embodiment of the present invention, the port type of each flexible stacking port is determined dynamically based on the stack topology selected by the user. In the example illustrated by FIG. 2, the stack topology selected by the user requires that flexible stacking ports $25_1$, $26_1$, $26_2$ and $27_3$ are configured as actual stacking ports. As a result, the active controller ST1 configures flexible stacking ports $25_1$, $26_1$, $26_2$ and $27_3$ as actual stacking ports. In one embodiment, the active controller configures each of these flexible stacking ports as actual stacking ports by transmitting a 'stack-port' instruction to the corresponding stackable devices.

FIG. 3 is a block diagram illustrating the relevant fields of a 'stack-port' instruction 300 in accordance with one embodiment of the present invention. 'Stack-port' instruction 300 includes message-type field 301, unit-id field 302 and stacking port id field 303.

The message-type field 301 identifies the associated instruction as a 'stack-port' instruction. The unit-id field 302 includes an ID value that identifies the stackable device having the flexible stacking port to be converted to an actual stacking port. The stacking port id field 303 includes a value that identifies the flexible stacking port to be converted to an actual stacking port. For example, in the example of FIG. 2, the processor $40_1$ of stackable device ST1 would generate a 'stack-port' instruction that includes a unit-id field 302 that identifies stackable device ST1, and a stacking port id field 303 that identifies flexible stacking port $25_1$. In response, stackable device ST1 configures flexible stacking port $25_1$ as an actual stacking port. The processor $40_1$ of stackable device ST1 would also generate a 'stack-port' instruction that includes a unit-id field 302 that identifies stackable device ST1, and a stacking port id field 303 that identifies flexible stacking port $26_1$, such that flexible stacking port $26_1$ is also configured as an actual stacking port.

If the stack 200 is configured manually, then processor $40_2$ of stackable device ST2 will issue a 'stack-port' instruction to configure flexible stacking port $26_2$ as an actual stacking port, and processor $40_3$ of stackable device ST3 will issue a 'stack-port' instruction to configure flexible stacking port $27_3$ as an actual stacking port.

However, if the stack 200 is configured automatically or by a secure stacking setup, wherein stackable device ST1 establishes the stack 200, the processor $40_1$ of stackable device ST1 would also send a 'stack-port' instruction to stackable device ST2 (via stacking link $SL_{12}$) that includes a unit-id field 302 that identifies stackable device ST2, and a stacking port id field 303 that identifies flexible stacking port $26_2$. In response, the processor $40_2$ of stackable device ST2 configures flexible stacking port $26_2$ as an actual stacking port. Similarly, the processor $40_1$ of stackable device ST1 would send a 'stack-port' instruction to stackable device ST3 (via stacking link $SL_{13}$) that includes a unit-id field 302 that identifies stackable device ST3, and a stacking port id field 303 that identifies flexible stacking port $27_3$. In response, the processor $40_3$ of stackable device ST3 configures flexible stacking port $27_3$ as an actual stacking port.

Note that because stack 200 has a linear topology, flexible stacking ports $1_2$-$8_2$ and $28_3$ are not initially required to be used as actual stacking ports. Thus, the stackable devices ST1-ST3 do not configure flexible stacking ports $1_2$-$8_2$ and $28_3$ as actual stacking ports. As a result, flexible stacking ports $1_2$-$8_2$ and $28_3$ may operate as regular data ports (by default).

In the event that new stackable devices are subsequently connected to flexible stacking ports $1_2$-$8_2$ and/or $28_3$, the active controller ST1 may configure these flexible stacking ports $1_2$-$8_2$ and $28_3$ to operate as actual stacking ports, thereby allowing the new stackable devices to join the stack 200. The manner in which a new stackable device may join the stack 200 will now be described in more detail.

Figure 4:
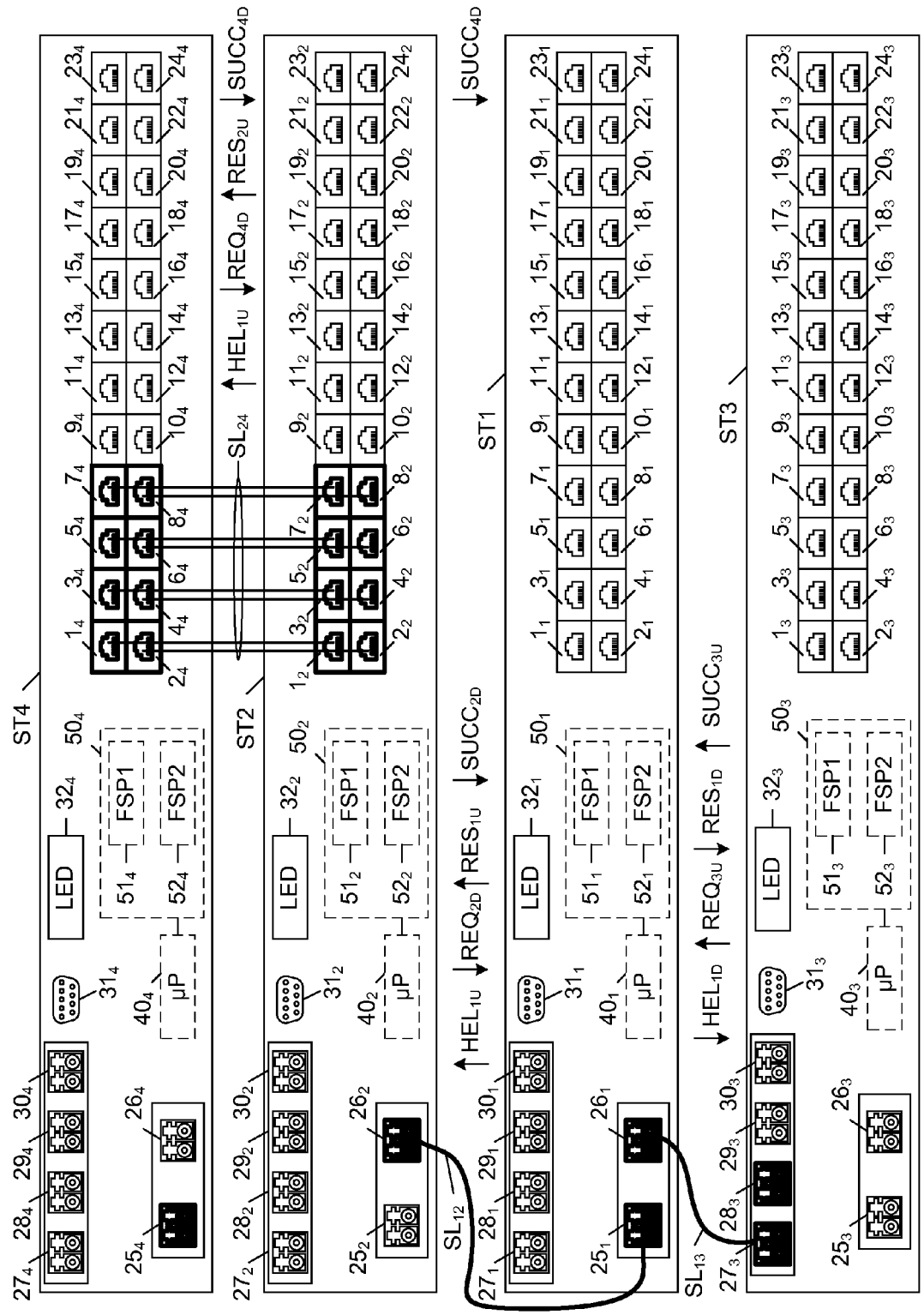
FIG. 4 is a block diagram illustrating a new stackable device, which is attempting to join the stack of FIG. 2 in accordance with one embodiment of the present invention.

FIG. 4 is a block diagram illustrating a new stackable device ST4, which is attempting to join stack 200. In the described example, stackable device ST4 is identical to stackable devices ST1-ST3, although this is not necessary. Similar elements on stackable devices ST1-ST4 are labeled with similar reference numbers, wherein elements on stackable device ST4 are labeled with the subscript '4'. Stackable device ST4 includes designated flexible stacking ports $25_4$, and $1_4$-$8_4$. Stacking link $SL_{24}$, which includes eight individual cables, connects the flexible stacking port $1_2$-$8_2$ of stackable device ST2 to the flexible stacking port $1_4$-$8_4$ of stackable device ST4.

After stack 200 has been established, all of the stackable devices ST1-ST3 of the stack 200 communicate with each other using a control protocol that includes 'hello' messages, which are described in more detail below. This control protocol is used to identify any new stackable devices (e.g., stackable device ST4) that are added to the existing stack 200.

In accordance with the control protocol, the active controller ST1 periodically sends 'hello' messages to the neighboring stackable devices ST2 and ST3. In response, these neighboring stackable devices ST2 and ST3 each complete an authentication process, and then (assuming that the authentication process is successful) return an 'authentication successful' message to the active controller ST1. Each 'authentication successful' message includes information identifying the stackable device that originates this message. As a result, the active controller ST1 receives periodic updates of any changes to the stack.

Stackable devices ST2 and ST3 also forward the received 'hello' messages to stackable devices (if any) coupled to the associated designated flexible stacking ports $1_2$-$8_2$ and $28_3$. Thus, stackable device ST4 will receive a 'hello' message from stackable device ST2 on stacking link $SL_{24}$. Upon receiving a 'hello' message, stackable devices ST2 and ST4 attempt to complete an authentication process. If this authentication process is successful, then stackable device ST4 will generate an 'authentication successful' message that provides information that identifies stackable device ST4. Stackable device ST4 transmits this 'authentication successful' message to stackable device ST2 (via stacking link $SL_{24}$). Stackable device ST2 will forward this 'authentication successful' message to active controller ST1 (via stacking link $SL_{12}$). In response, active controller ST1 determines that the newly connected stackable device ST4 is available to join the stack. To add stackable device ST4 to the stack 200, active controller ST1 transmits a first 'stack-port' instruction to stackable device ST2 to configure flexible stacking port $1_2$-$8_2$ as an actual stacking port, and a second 'stack-port' instruction to stackable device ST4 to configure flexible stacking port $1_4$-$8_4$ as an actual stacking port.

Note that if the authentication of stackable device ST4 is successful, then stackable device ST4 will also forward the received 'hello' message on its other designated flexible stacking port $25_4$.

If the authentication of stackable device ST4 fails, then the stackable device ST4 does not generate an 'authentication successful' message, and does not forward the 'hello' message. Under these conditions, the stackable device ST4 is not allowed to join the stack 200.

Note that it is possible that the authentication of stackable device ST4 is successful, but stackable device ST4 is already a member of another stack (not shown). In this case, the stackable device ST4 does not generate a 'reply' message in response to the 'hello' message received from stackable device ST2, and does not forward the received 'hello' message on flexible stacking port $25_4$. Under these conditions, the stackable device ST4 is not allowed to join the stack 200.

In accordance with one embodiment, the number of stackable devices that can be included in the stack is limited to a predetermined number. In this case, the number of times that the 'hello' message is forwarded is also limited, such that the 'hello' message is not forwarded to stackable devices that cannot possibly join the stack.

Note that the 'authentication successful' messages (or lack thereof) will also inform the active controller ST1 when a stackable device is removed from the stack. When the topology of the stack is changed, the configuration information stored by the stack members is modified accordingly (under the control of the active controller).

The above-described 'hello' message, 'authentication successful' message and authentication process will now be described in more detail. CLI logic 131 of stackable device ST1 periodically transmits a 'hello' message $HEL_{1U}$ on upstream stacking port $25_1$, and a 'hello' message $HEL_{1D}$ on downstream stacking port $26_1$.

Figure 5:
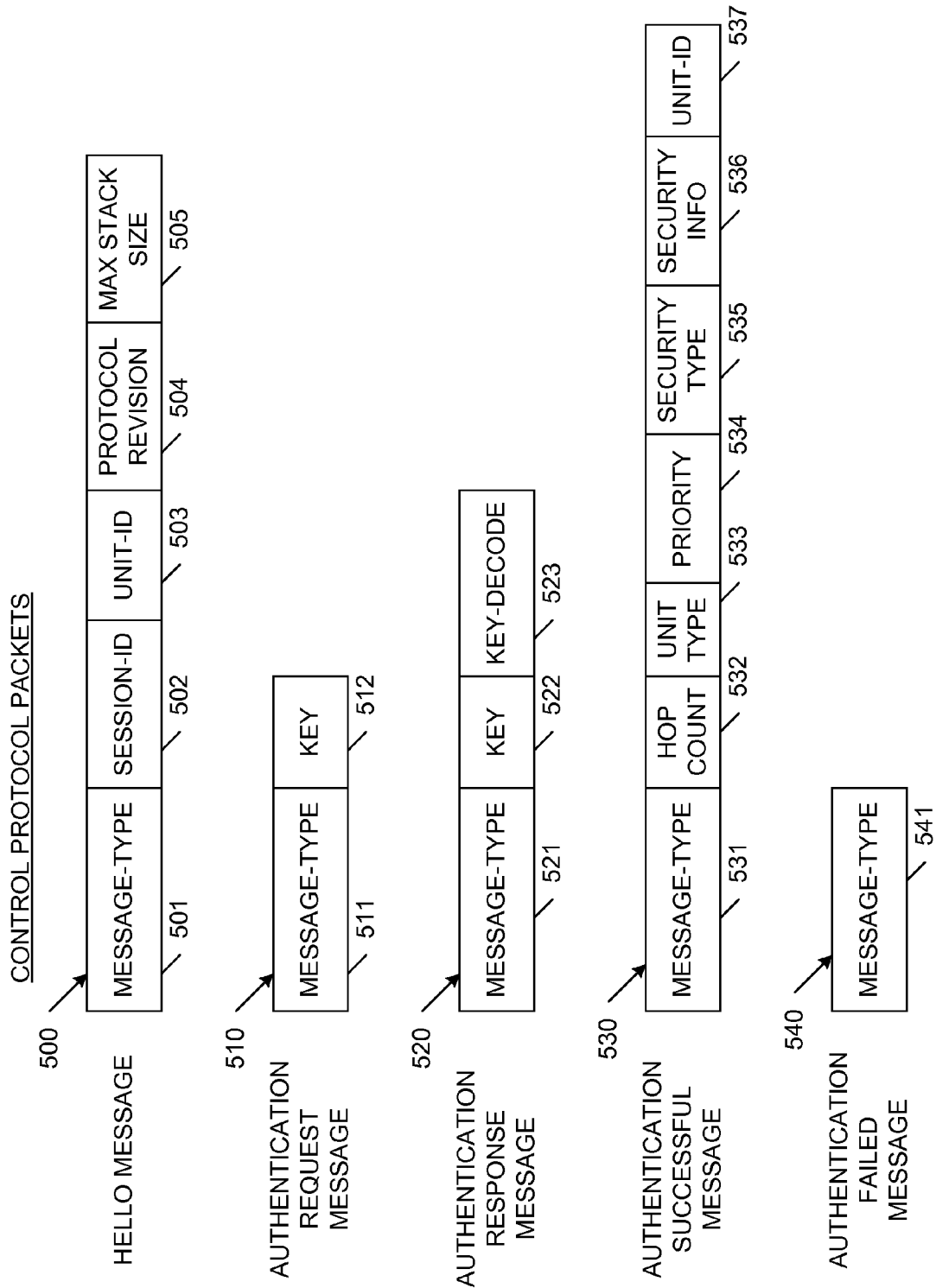
FIG. 5 is a block diagram that illustrates the relevant fields of a 'hello' message, an 'authentication request' message, an 'authentication response' message, a 'reply' message, and an 'authentication failed' message, in accordance with one embodiment of the present invention.

FIG. 5 is a block diagram that illustrates the relevant fields of a 'hello' message 500, an 'authentication request' message 510, an 'authentication response' message 520, an 'authentication successful' message 530, and an 'authentication failed' message 540, in accordance with one embodiment of the present invention.

Each 'hello' message 500 includes a message-type field 501, a session-id field 502, a unit-id field 503, a protocol revision field 504 and a maximum stack size field 505. The message-type field 501 identifies the associated message as a 'hello' message. The purpose of the 'hello' message is to request information from the neighboring stackable device. The session-id field 502 identifies the discovery process currently being implemented. The unit-id field 503 includes an ID value that identifies the stackable device that originates the 'hello' message (i.e., stackable device ST1). In the described examples, the unit-id field 503 of the 'hello' messages $HEL_{1U}$ and $HEL_{1D}$ will identify stackable device ST1. This unit-id field 503 may include, for example, the MAC address of stackable device ST1. The protocol revision field 504 includes information that identifies the current revision of the control protocol being used. The maximum stack size field 505 includes a value that identifies the number of times that the 'hello' message can be forwarded. In the described examples, the maximum stack size field 505 is initially selected to have a value of '7', such that the corresponding 'hello' message can be forwarded up to seven times in either the upstream or downstream direction. The maximum number of stackable devices in the stack is limited to the initial value stored in the maximum stack size field 505, plus one.

The 'hello' message $HEL_{1U}$ transmitted on stacking port $25_1$ reaches the stacking port $26_2$ of stackable device ST2 at 1 hop via stacking link $SL_{12}$. Similarly, the 'hello' message $HEL_{1D}$ transmitted on stacking port $26_1$ reaches the stacking port $27_3$ of stackable device ST3 at 1 hop via stacking link $SL_{13}$.

Upon receiving the 'hello' message $HEL_{1U}$ on stacking port $SP_{2D}$, stackable device ST2 determines whether its associated protocol revision information matches the protocol revision information included in the protocol revision field 504 of the received 'hello' message $HEL_{1U}$. Stackable device ST2 may decide to discontinue the discovery process if a match is not detected. In this case, stackable device ST2 will not forward the received 'hello' message $HEL_{1U}$, thereby preventing the discovery of upstream stackable devices through stackable device ST2. Stackable device ST3 performs similar operations in response to the 'hello' message $HEL_{1D}$ received on stacking port $27_3$. The protocol revision information ensures that all members of a stack are configured to implement the same protocol. In the described examples, it is assumed that all of the stackable devices ST1-ST4 implement the same protocol revision.

Thus, upon receiving the 'hello' message $HEL_{1U}$ on stacking port $26_2$, stackable device ST2 initiates an authentication process, wherein stackable device ST2 determines whether the stackable device ST1 that transmitted the 'hello' message $HEL_{1U}$ is an authentic device (i.e., a stackable device that should be allowed to join a stack that includes stackable device ST2). Similarly, upon receiving the 'hello' message $HEL_{1D}$ on stacking port $27_3$, stackable device ST3 initiates an identical authentication process.

To initiate the authentication process, a stackable device transmits an 'authentication request' message to the stacking link on which the corresponding 'hello' message was received. Thus, stackable device ST2 transmits an 'authentication request' message $REQ_{2U}$ to stackable device ST1 via stacking link $SL_{12}$. Similarly, stackable device ST3 transmits an 'authentication request' message $REQ_{3U}$ to stackable device ST1 via stacking link $SL_{13}$. Each 'authentication request' message 510 includes a message-type field 511 and a key field 512 (FIG. 5). The message-type field 511 stores a value that identifies the associated message as an 'authentication request' message. The key field 512 stores a key value that is to be decoded by the stackable device receiving the 'authentication request' message. In the present example, 'authentication request' message $REQ_{2D}$ includes a first key value $KEY_1$, and 'authentication request' message $REQ_{3U}$ includes a second key value $KEY_2$.

In response to receiving an 'authentication request' message, a stackable device will generate a decoded key value in response to the key value included in the 'authentication request' message. Thus, stackable device ST1 generates a first decoded key value $DKEY_1$ in response to the key value $KEY_1$ included in the received 'authentication request' message $REQ_{2D}$. Stackable device ST1 also generates a second decoded key value $DKEY_2$ in response to the key value $KEY_2$ included in the received 'authentication request' message $REQ_{3U}$.

Stackable device ST1 then returns the decoded key values to the stackable devices that originated the 'authentication request' messages. More specifically, stackable device ST1 generates 'authentication response' messages $RES_{1U}$ and $RES_{1D}$, which are transmitted to stackable devices ST2 and ST3, respectively. Each 'authentication response' message 220 includes message-type field 521, key field 522 and key-decode field 523 (FIG. 5). The message-type field 521 stores a value that identifies the associated message as an 'authentication response' message. The key field 522 stores the key value that was originally received in the corresponding 'authentication request' message. The key-decode field 523 includes the decoded key value that was generated in response to the key value of key field 522. Thus, stackable device ST1 provides an 'authentication response' message $RES_{1U}$ to stackable device ST2, wherein this message $RES_{1U}$ includes the key value $KEY_1$ of the 'authentication request' message $REQ_{2D}$ and the corresponding decoded key value $DKEY_1$. Stackable device ST1 also provides an 'authentication response message $RES_{1D}$ to stackable device ST3, wherein this message $RES_{1D}$ includes the key value $KEY_2$ of the 'authentication request' message $REQ_{3U}$ and the corresponding decoded key value $DKEY_2$.

Upon receiving an 'authentication response' message, a stackable device will determine whether the authentication process was a success or a failure. To accomplish this, the stackable device receiving the 'authentication response' message independently generates a decoded key value in response to the original key value. For example, upon receiving the authentication response message $RES_{1U}$, stackable device ST2 independently generates a decoded key value $DKEY_1$' in response to the original key value $KEY_1$. If this independently generated decoded key value $DKEY_1$' matches the decoded key value $DKEY_1$ included in the 'authentication response' message $RES_{1U}$, then the authentication process is successful. Otherwise, the authentication process has failed. Note that both stackable devices must implement the same key decoding algorithm in order for the authentication process to be successful. Unauthorized stackable devices will not implement the same key decoding algorithms as authentic stackable devices, thereby preventing the authentication of unauthorized stackable devices. In this manner, the authentication process prevents a malicious device from joining the stack, thereby providing security to the user.

If a stackable device determines that the authentication process has failed because the decoded key values do not match, then this stackable device returns an 'authentication failed' message to the neighboring stackable device from which the 'hello' message was received. For example, upon determining that the authentication process has failed, stackable device ST2 will transmit an 'authentication failed' message $FAIL_{2D}$ to stackable device ST1. Similarly, upon determining that the authentication process has failed, stackable device ST3 will transmit an 'authentication failed' message $FAIL_{3U}$ to stackable device ST1. Each 'authentication failed' message 540 includes a message-type field 541, which indicates that the authentication process was unsuccessful. In response to receiving the $FAIL_{2D}$ message or the $FAIL_{3U}$ message, stackable device ST1 will not allow the corresponding stackable device ST2 or ST3 to join the stack (or will remove the corresponding stackable device ST2 or ST3 from the existing stack). In addition, if the authentication process has failed within a stackable device, then this stackable device will not forward the received 'hello' message. For example, if authentication fails within stackable device ST2, then stackable device ST2 will not forward the received 'hello' message $HEL_{1U}$ on its upstream stacking port $1_2$-$8_2$, thereby preventing the discovery of upstream stackable device ST4 through stackable device ST2. However, in the described examples, it is assumed that the authentication process is successful in both of stackable devices ST2 and ST3. Note the authentication process should be successful in stackable devices ST2 and ST3 because as these stackable devices are original members of the stack 200.

A stackable device that determines that the authentication process was successful returns an 'authentication successful' message to the neighboring stackable device from which the 'hello' message was received. For example, upon determining that the authentication process was successful, stackable devices ST2 and ST3 transmit 'authentication successful' messages $SUCC_{2D}$ and $SUCC_{3U}$, respectively, to stackable device ST1.

In accordance with one embodiment, the successful authentication of a stackable device will expire after a predetermined period (e.g. 1 minute) of inactivity. Thus, the 'authentication successful' message must be sent before the predetermined period expires.

Each 'authentication successful' message 530 includes message-type field 531, hop-count field 532, unit-type field 533, priority field 534, security type field 535, security information field 536 and unit-id field 537 (FIG. 5). The message-type field 531 stores a value that identifies the associated message as an 'authentication successful' message. The hop count field 532 indicates the number of hops that the 'authentication successful' message has traveled. The stackable device that originally generates the 'authentication successful' message sets the hop count field 532 to a value of '1'. Thus, when stackable device ST1 receives the 'authentication successful' message $SUCC_{2D}$ that originates in stackable device ST2, or the 'authentication successful' message $SUCC_{3U}$ that originates in stackable device ST3, the hop count field 532 will have a value of '1'. If a stackable device that is not the active controller receives an 'authentication successful' message on one of its stacking ports, this stackable device will add '1' to the value stored in the hop count field 532, and then forward the modified 'authentication successful' message to its other stacking port. As a result, when an 'authentication successful' message is received by the active controller (i.e., stackable device ST1), the hop count field 532 indicates the number of hops that exist between the stackable device that originated the 'authentication successful' message and the active controller. The value stored in the hop count field 532 is limited to the value initially stored in the maximum stack size field 505 of 'hello' message 500. (e.g., 7).

The unit type field 533 includes information that identifies the type (e.g., model number) of the stackable device that originally generates the 'authentication successful' message. Note that the stack 200 may support multiple different unit types.

The priority field 534 includes a priority value that specifies an assigned priority of the stackable device that originally generates the 'authentication successful' message 530. In the described examples, the stackable devices ST2 and ST3 have assigned priority value lower than the assigned priority value of stackable device ST1. The security type field 535 and the security information field 536 support further authentication, which may be required by stackable devices other than the active controller. The security type field 535 identifies a 'type' of security information included in the security information field 536. The security information field 536 includes the actual security information required to access the stackable device that originates the 'authentication successful' message. For example, the security type field 535 of 'authentication successful' message $SUCC_{2D}$ may indicate that a password is required in order to access stackable device ST2. In this case, the security information field 536 of 'authentication successful' message $SUCC_{2D}$ includes the (encrypted) password required to access stackable device ST2. In response to receiving the 'authentication successful' message $SUCC_{2D}$, stackable device ST1 decrypts the encrypted password. When a stackable device is initially added to the stack, the user must enter the password required to access the stackable device. In accordance with one embodiment, the password is entered via a user console connected to port $31_1$ of the stackable device ST1. Thus, during the setup of the stack, the user properly enters the required password, such that stackable device ST1 allows the password-protected stackable device ST2 to join in the stack 200. (Note that, if the user does not enter the correct password during setup, stackable device ST1 would not allow stackable device ST2 to join the stack 200). Stackable device ST1 stores the correct password in memory 501, such that a user only has to enter the required password once. When stackable device ST1 receives 'authentication successful' messages after the initial configuration of the stack 200, stackable device ST1 compares the previously stored correct password with the contents of the security information field 536 of these 'authentication successful' messages.

The unit-id field 537 includes a value, such as a MAC address, that identifies the stackable device that originates the 'authentication successful' message. Upon receiving the 'authentication successful' messages $SUCC_{2D}$ and $SUCC_{3U}$ (and confirming that any required security information matches the corresponding security information stored by stackable device ST1), the stackable device ST1 (active controller) stores the associated information (i.e., hop-count, unit-type, priority, security type, security info and unit-id) in a connectivity database within memory $50_1$. Stackable device ST1 monitors any changes to the connectivity database to determine if there are have been changes to the topology of the stack 200.

If a stackable device generates an 'authentication successful' message in response to a 'hello' message received on a first stacking port of the stackable device, then this stackable device will determine whether the value stored in the maximum stack size field 205 of this received 'hello message' has a positive value. If so, then this stackable device will decrement the value stored in the maximum stack size field 505 of this 'hello' message by one, and forward the modified 'hello' message onto the second stacking port of the stackable device.

In the example of FIG. 4, stackable device ST2 determines that the value stored in the maximum stack size field 505 of the received 'hello' message $HEL_{1U}$ has a positive value (i.e., '7'). In response, stackable device ST2 decrements this value by one, such that the maximum stack size field 505 of the 'hello' message $HEL_{1U}$ stores a value of '6'. Stackable device then forwards this modified 'hello' message $HEL_{1U}$ to stackable device ST4 (via stacking port $1_2$-$8_2$, stacking link $SL_{24}$ and stacking port $1_4$-$8_4$). In response, stackable device ST4 initiates the authentication process described above, wherein stackable device ST4 transmits an 'authentication request' message $REQ_{4U}$ to stackable device ST2, stackable device ST2 returns an 'authentication response' message $RES_{2U}$ to stackable device ST4, and stackable device ST4 determines whether the authentication process was successful or failed. If the authentication is successful (and stackable device ST4 is not already a member of another stack), stackable device ST4 generates an 'authentication successful' message $SUCC_{4D}$ in the manner described above. This 'authentication successful' message is transmitted to stackable device ST2 (via stacking port $1_4$-$8_4$, stacking link $SL_{24}$ and stacking port $1_2$-$8_2$). Stackable device ST2 adds '1' to the hop count field 532 of this 'authentication successful' message $SUCC_{4D}$, such that this hop count field 532 is modified to have a value of '2'. Stackable device ST2 then transmits the modified 'authentication successful' message $SUCC_{4D}$ to stackable device ST1 (via stacking port $26_2$, stacking link $SL_{12}$ and stacking port $25_1$). Note that the 'authentication successful' message received by stackable device ST1 properly indicates that stackable device ST4 is 2 hops from stackable device ST1 in the upstream direction.

If the authentication fails, then stackable device ST4 generates an 'authentication failed' message $FAIL_{4D}$ in the manner described above. This 'authentication failed' message is transmitted to stackable device ST2 (via stacking port $1_4$-$8_4$, stacking link $SL_{24}$ and stacking port $1_2$-$8_2$). In response, stackable device ST2 does not allow stackable device ST4 to join the stack 200 via stacking link $SL_{24}$. That is, stackable device ST2 does forward any information about stackable device ST4 to stackable device ST1. In the manner described above, the authentication process is performed between two neighboring stackable devices, and therefore does not always require the participation of the active controller.

Note that after a 'hello' message has been forwarded seven times, the maximum stack size field 505 of this 'hello' message will have a value of '0'. If a stackable device receives a 'hello' message with a maximum stack size field 505 having a value of '0', this stackable device will neither respond to nor forward this 'hello' message, because it is not possible that any stackable device receiving the 'hello' message could be added to the stack without exceeding the maximum stack size. Note that if the maximum number of stackable devices (e.g., 8) are connected in a ring topology, then the stackable device ST1 will receive 'hello' messages $HEL_{1U}$ and $HEL_{1D}$ having maximum stack size fields 505 that store values of '0'. In this case, the stackable device ST1 may use these received 'hello' messages $HEL_{1U}$ and $HEL_{1D}$ to determine that the stack is connected in a ring topology.

Upon receiving the 'authentication successful' message $SUCC_{4D}$ from the newly connected stackable device ST4, stackable device ST1 determines whether this 'authentication successful' message includes entries in the security type field 535 and the security information field 536 that require the entry of a password. If so, stackable device ST1 will prompt the user to enter the required security information. Upon receiving (and storing) the required security information, stackable device ST1 stores the information included in 'authentication successful' message $SUCC_{4D}$ in the connectivity database. Stackable device ST1 determines that the identifying information associated with stackable device ST4 was not previously stored in the connectivity database.

In response, stackable device ST1 dynamically determines whether this stackable device ST4 can join the stack 200, based on the contents of the connectivity database and the limitations of maximum stack size (i.e., based on the configuration of the stack). If the stackable device ST1 determines that the newly detected stackable device ST4 can join the stack 200, then stackable device ST1 issues 'stack port' instructions that cause flexible stacking ports $1_2$-$8_2$ and $1_4$-$8_4$ to be configured as actual stacking ports. More specifically, stackable device ST1 issues a first 'stack-port' instruction (on stacking port $25_1$) that includes a unit-id field 302 that identifies stackable device ST2, and a stacking port id field 303 that identifies flexible stacking port $1_2$-$8_2$. In response, stackable device ST2 configures flexible stacking port $1_2$-$8_2$ as an actual stacking port. Stackable device ST1 also issues a second 'stack-port' instruction (on stacking port $25_1$) that includes a unit-id field 302 that identifies stackable device ST4, and a stacking port id field 303 that identifies flexible stacking port $1_4$-$8_4$, such that flexible stacking port $1_4$-$8_4$ is also configured as an actual stacking port. If the stackable device ST1 determines that the new stackable device ST4 cannot join the stack 200, then the flexible stacking ports $1_2$-$8_2$ and $1_4$-$8_4$ can still function as regular data ports.

Although the present invention has been described in connection with various embodiments, it is understood that variations of these embodiments would be obvious to one of ordinary skill in the art. For example, although the present invention has been described in connection with a stack having a linear topology, it is understood that the present invention could be implemented in a stack having a ring topology. Thus, the present invention is limited only by the following claims.

We claim:

1. A stackable device comprising a plurality of data ports, wherein the plurality of data ports includes all data ports of the stackable device, and wherein each of the plurality of data ports is configured to operate as a regular data port by default.

2. The stackable device of claim 1, further comprising a first memory entry that stores information that identifies a first data port of the plurality of data ports as a first flexible stacking port of the stackable device, wherein the first flexible stacking port is configured to operate as a regular data port by default.

3. The stackable device of claim 2, further comprising memory that stores configuration information identifying a stack configuration, wherein the configuration information indicates whether the first flexible stacking port should be configured as an actual stacking port in the stack configuration.

4. The stackable device of claim 3, further comprising means for configuring the first flexible stacking port to operate as a first stacking port if the configuration information indicates that the first flexible stacking port should be configured as an actual stacking port.

5. The stackable device of claim 2, further comprising a second memory entry that stores information that identifies a second data port of the plurality of data ports as a second flexible stacking port of the stackable device, wherein the second flexible stacking port is configured to operate as a regular data port by default.

6. The stackable device of claim 5, further comprising memory that stores configuration information identifying a stack configuration, wherein the configuration information indicates whether the first and second flexible stacking ports should be configured as actual stacking ports in the stack configuration.

7. The stackable device of claim 6, further comprising means for configuring the first flexible stacking port to operate as a first stacking port if the configuration information indicates that the first flexible stacking port should be configured as an actual stacking port.

8. The stackable device of claim 7, further comprising means for configuring the second available stacking port to operate as a second stacking port if the configuration information indicates that the second flexible stacking port should be configured as an actual stacking port.

9. The stackable device of claim 2, wherein the first memory entry further stores information that identifies one or more additional data ports of the plurality of data ports as being included in the first flexible stacking port.

10. The stackable device of claim 2, wherein the plurality of data ports includes a first set of data ports, each having a first data transfer bandwidth, and a second set of data ports, each having a second data transfer bandwidth greater than the first data transfer bandwidth.

11. The stackable device of claim 10, wherein the first data port is a member of the first set of data ports.

12. The stackable device of claim 10, wherein the first data port is a member of the second set of data ports.

13. The stackable device of claim 2, further comprising means for programming the first memory entry to store information that identifies anyone of the plurality of data ports as the first data port.

14. A method comprising:
configuring a first data port of a first stackable device to operate as a regular data port by default; and then
configuring the first data port of the first stackable device to operate as a first stacking port that couples the first stackable device to another stackable device.

15. The method of claim 14, further comprising selecting the first data port from a plurality of data ports of the first stackable device.

16. The method of claim 14 further comprising:
identifying a configuration of a stack that includes the first stackable device; and then
configuring the first data port to operate as a first stacking port in response to the configuration of the stack.

17. The method of claim 14, further comprising:
configuring a second data port of the first stackable device to operate as a regular data port; and
configuring the second data port of the first stackable device to operate as a second stacking port that couples the first stackable device to another stackable device.

18. The method of claim 17, further comprising selecting the first and second data ports from a plurality of data ports of the first stackable device.

19. The method of claim 14, further comprising:
configuring a second data port of the first stackable device to operate as a regular data port; and
configuring the first and second data ports of the first stackable device to operate as the first stacking port.

20. A method comprising:
selecting any first one of a plurality of data ports of a first stackable device as a first flexible stacking port;
configuring the first flexible stacking port to operate as a regular data port by default; and then
configuring the first flexible stacking port as an actual stacking port of the first stackable device.

21. The method of claim 20, further comprising:
identifying a configuration of a stack that includes the first stackable device; and then
configuring the first flexible stacking port as an actual stacking port of the first stackable device in response to the configuration of the stack.

22. The method of claim 20, wherein the plurality of data ports comprises all data ports of the first stackable device.

23. The method of claim 20, further comprising:
selecting any second one of the plurality of data ports of the first stackable device as a second flexible stacking port; and
configuring the second flexible stacking port as an actual stacking port of the first stackable device.

24. The method of claim 20, further comprising selecting any second one of the plurality of data ports of the first stackable device, wherein the first and second ones of the plurality of data ports, in combination, are included in the first flexible stacking port.

* * * * *